United States Patent [19]

Mannschke

[11] Patent Number: 4,878,728
[45] Date of Patent: Nov. 7, 1989

[54] MULTILAYER INTEGRATED OPTICAL DEVICE

[75] Inventor: Lothar P. Mannschke, Eckental-Eckenhaid, Fed. Rep. of Germany

[73] Assignee: U.S. Philips Corporation, New York, N.Y.

[21] Appl. No.: 198,700

[22] Filed: May 23, 1988

Related U.S. Application Data

[63] Continuation of Ser. No. 681,162, Dec. 13, 1984, abandoned.

[30] Foreign Application Priority Data

Dec. 17, 1983 [DE] Fed. Rep. of Germany ....... 3345715
Dec. 17, 1983 [DE] Fed. Rep. of Germany ....... 3345716

[51] Int. Cl.⁴ .............................................. G02B 6/30
[52] U.S. Cl. ............................... 350/96.17; 350/96.20
[58] Field of Search ............... 350/96.15, 96.16, 96.17, 350/96.18, 96.20, 96.21

[56] References Cited

U.S. PATENT DOCUMENTS 4,468,085  8/1984  Papuchon et al. ........... 350/96.15 X
4,575,180  3/1986  Chang ............................. 350/96.15

FOREIGN PATENT DOCUMENTS 0052901  2/1982  European Pat. Off. .
56-155907  2/1981  Japan .
0102817  8/1981  Japan ............................... 350/96.20
0209710  12/1983  Japan ............................... 350/96.15
0029210  2/1984  Japan ............................... 350/96.15

Primary Examiner—Gene Wan
Attorney, Agent, or Firm—Algy Tamoshunas; Leroy Eason

[57] ABSTRACT

An integrated optical device comprises stacked substrates provided with optical waveguides in different planes. The waveguides in different planes are interconnected by external optical elements.

15 Claims, 2 Drawing Sheets

MULTILAYER INTEGRATED OPTICAL DEVICE

This is a continuation of application Ser. No. 681,162, filed Dec. 13, 1984, now abandoned.

BACKGROUND OF THE INVENTION

The invention relates to an integrated optical device comprising at least one substrate for planar waveguides or strip waveguides, in particular for use in optical communications. Planar wave-guides may be manufactured from flat light-conducting layers. Light-conducting strips (i.e. strip waveguides) may be manufactured analogously to the manufacture of the conductors of a printed circuit board.

It is known (for example from European Pat. No. 0,052,901) to arrange mirror-image halves of optical waveguides in the surfaces of two substrates. The surfaces are subsequently attached to each other to form a circular waveguide which can earily be connected to glass fibers for telecommunication. These optical waveguides form networks in just one plane.

SUMMARY OF THE INVENTION

It is an object of the invention to provide an integrated low-loss optical device, which can be arranged to perform a multitude of optical functions, with a compact construction.

According to the invention, in an integrated optical device the waveguides are arranged in different planes. The waveguides in one plane and the waveguides in the other plane are interconnected by external optical elements.

The invention is based on the recognition of the fact that multifunction integrated optical devices occupy a large surface area. The surface area can be reduced by providing both sides of each substrate with layers which are optically interconnected. Thus, a plurality of such substrates may be stacked, aand their waveguides may be interconnected, for example, by means of imaging systems or optical fibers. In this way various functions can be performed in different planes which are situated close above each other.

DESCRIPTION OF THE PREFERRED EMBODIMENTS

Figure 1:
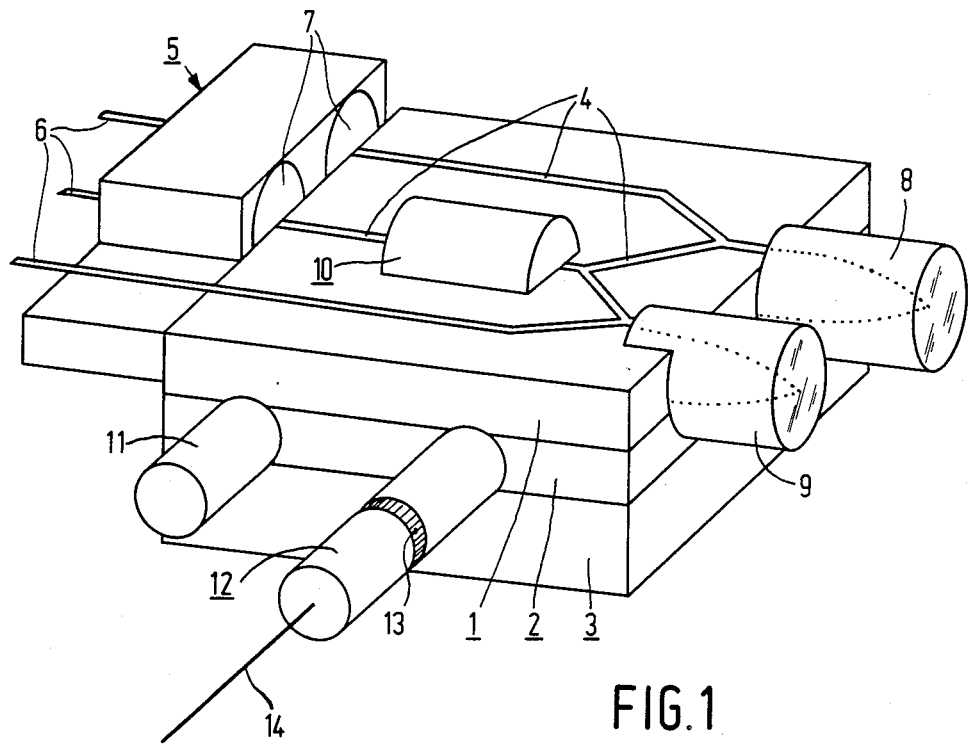
FIG. 1 is a perspective view of an integrated optical device with a multilayer structure using graded-index lenses as optical connectors.

FIG. 1 shows a multilayer integrated optical device which comprises separate integrated optical devices 1, 2 and 3 which have been superimposed. The optical devices 1, 2 and 3 are substrates in whose surfaces strip waveguides 4 have been arranged. The shapes of the paths of the strip waveguides 4 depends on the envisaged optical functions.

By means of edge connectors 5, the strip waveguides 4 can be connected to the optical fibers 6 of an optical transmission system. Alternatively, the edge connectors may use graded-index (GRIN) lenses 7. The lenses 7 have lengths equal to half their pitch, so as to, which image the strip waveguides onto the optical fibers.

The strip waveguides 4 in the various planes of the integrated optical device are optically interconnected by imaging their end faces onto each other. For this purpose the strip waveguides 4 are arranged substantially parallel to each other and perpendicular to the edge in predetermined areas. The ends of the strip waveguides thus arranged are provided with GRIN lenses 8 and 11 which have lengths equal to 0.25 times their pitch. Lenses 8 and 11 are reflecting on one side, in and thus image the end faces of these strip waveguides onto each other.

If the reflective coating is aan interference layer 13 which transmits a predetermined wavelength, it is possible to couple out a specific part of the light in the fibers 14 by means of another 0.25-pitch GRIN lens 12 arranged on the interference layer 13. The arrangement comprising two 0.25-pitch pitch GRIN lenses images a strip waveguide onto the fiber 14. It is also possible to provide a semireflective coating (wavelength independent) which couples out part of the light transmitted from one strip waveguide to another strip waveguide e.g. (for monitoring purposes).

If at another location an optical connection between strip waveguides is to be made within the substrate, suitably reflection-coated GRIN lenses 9 are arranged in a slot which leads to the coupling point. Such coupling points may be situated completely inside an integrated optical device, using 0.5-pitch GRIN lenses which image strip waveguides of one plane in another plane.

Figure 2:
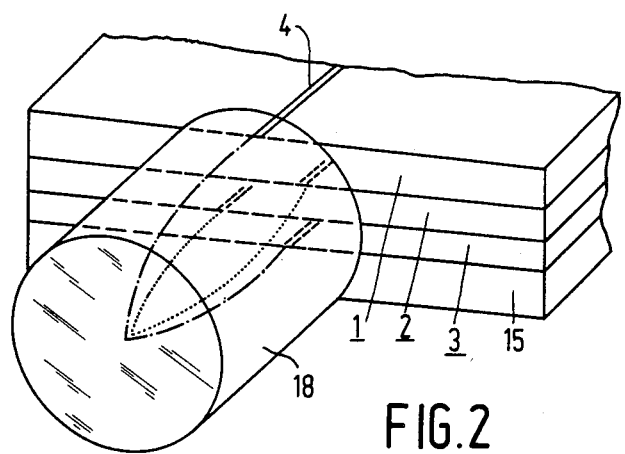
FIG. 2 is a perspective view of a part of FIG. 1 on an enlarged scale.

In FIG. 2, which shows aa part of the integrated optical device on an enlarged scale, the radiation paths via which strip waveguides in different planes are connected via a lens have been represented by different broken lines.

Figure 3:
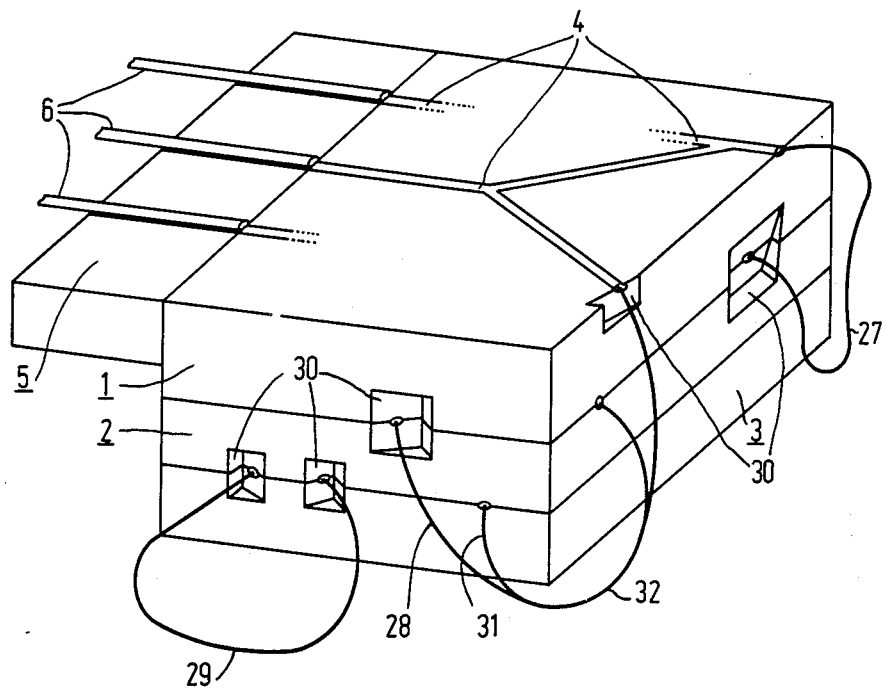
FIG. 3 is a perspective view of a multilayer integrated optical device using optical fibers as optical interconnections.

The optical multilayer device shown in FIG. 3 is an integrated optical device which comprises separate integrated optical devices 1, 2 and 3 which are superimposed. The devices 1, 2 and 3 are substrates in whose surfaces strip waveguides 4 have been arranged. The configurtions of the strip waveguides 4 depends on the envisaged optical functions of these waveguides.

Via edge connectors 5, the strip waveguides 4 can be connected to optical fibers 6 of an optical transmission system. The edge connectors may alternatively comprise graded-index lenses.

The strip waveguides 4 in the different planes of the integrated optical device are optically interconnected by means of separate optical fibers 27 and 28. The strip waveguides 4 extend up to the edge at specific locations. The optical fibers 27 and 28 are cemented to the ends of these strip waveguides 4. These optical fibers are positioned by means of manipulators which also keep the fibers in the correct positions during cementing. After the cement has cured the manipulators are removed.

The optical fibers 27 and 28 are secured to edge recesses 30 of the substrates at the same angles at which the strip waveguides 4 are disposed at the edge. Alternatively, the edge-recesses 30 may be funnel-shaped, their shapes being such as to assist in positioning the optical fibers 27, 28 or 29.

By means of the fiber 29, the strip waveguides on the substrate 3 are connected. The free ends of the fibers 28 and 31 may be combined and may form a coupler 32.

What is claimed is:

1. A multilayer integrated optical device comprising:
   a substrate;
   a first optical waveguide arranged on or in the substrate, said first waveguide extending in at least two directions substantially in a first plane, said first waveguide having an end face;
   a second optical waveguide arranged on or in the substrate, said second waveguide extending substantially in a second plane, said second plane being spaced from but substantially parallel to the first plane, said second waveguide having an end face arranged substantially above or below the end face of the first waveguide; and
   means for imaging the end face of the first optical waveguide and the end face of the second optical waveguide onto each other, said means being arranged at least partly outside the substrate.

2. A multilayer integrated optical device as claimed in claim 1, characterized in that the imaging means comprises a graded index lens having an optical axis, said optical axis being parallel to the first and second planes.

3. A multilayer integrated optical device as claimed in claim 2, characterized in that:
   the graded index lens has a length, a pitch, and a side arranged remote from the waveguides;
   the remote side is provided with a reflective coating; and
   the length of the lens is equal to one-quarter of the pitch of the lens.

4. A multilayer integrated optical device as claimed in claim 3, characterized in that:
   the reflective coating transmits a preselected wavelength; and
   the device further comprises a second graded index lens arranged on the reflective coating opposite the first graded index lens.

5. A multilayer integrated optical device as claimed in claim 3, characterized in that the reflective coating is semireflective for all wavelengths.

6. A multilayer integrated optical device as claimed in claim 5, characterized in that the waveguides are strip waveguides.

7. A multilayer integrated optical device as claimed in claim 1, characterized in that the optical coupling means comprises a coupling optical fiber.

8. A multilayer integrated optical device as claimed in claim 7, characterized in that the coupling fiber comprises two optical fibers, said two fibers being combined to form an optical coupler.

9. A multilayer integrated optical device as claimed in claim 1, characterized in that:
   the first and second optical waveguides have end faces;
   the substrate has recesses at the ends faces of the waveguides; and
   the optical coupling means is secured in the recesses in the substrate.

10. A multilayer integrated optical device as claimed in claim 1, characterized in that the waveguides are strip waveguides.

11. A multilayer integrated optical device as claimed in claim 1, characterized in that the waveguides are planar waveguides.

12. A multilayer integrated optical device as claimed in claim 1, characterized in that the device comprises a plurality of stacked substrates.

13. A multilayer integrated optical device comprising:
    a substrate having a substantially planar surface;
    a plurality of first optical waveguides arranged on or in the substrate, said first waveguides extending substantially in a first plane coplanar with or substantially parallel to the plane of said surface;
    a second optical waveguide arranged on or in the substrate, said second waveguide extending substantially in a second plane, said second plane being spaced from but substantially parallel to both said first plane and the plane of said surface; and
    means for optically coupling one first optical waveguide to the second optical waveguide, said means being arranged at least partly outside the substrate.

14. A multilayer integrated optical waveguide as claimed in claim 13, characterized in that the device comprises a plurality of stacked substrates.

15. A multi-layer integrated optical device as claimed in claim 13, characterized in that a plurality of second optical waveguides are arranged on or in the substrate and extending substantially in said second plane, and said optical coupling means optically couples at least one of said first optical waveguides to at least one of said second optical waveguides.

* * * * *